United States Patent [19]

Mensch, Jr.

[11] Patent Number: 4,800,487
[45] Date of Patent: * Jan. 24, 1989

[54] TOPOGRAPHY OF INTEGRATED CIRCUIT INCLUDING A MICROPROCESSOR

[76] Inventor: William D. Mensch, Jr., 1924 E. Hope St., Mesa, Ariz. 85203

[*] Notice: The portion of the term of this patent subsequent to Mar. 24, 2004 has been disclaimed.

[21] Appl. No.: 29,272

[22] Filed: Mar. 23, 1987

Related U.S. Application Data

[63] Continuation of Ser. No. 534,181, Sep. 20, 1983, Pat. No. 4,652,992.

[51] Int. Cl.$^4$ .............................................. G06Z 1/00
[52] U.S. Cl. ............................ 364/200; 307/463; 307/469
[58] Field of Search ... 364/200 MS File, 900 MS File, 364/490, 491; 365/103; 307/449, 463, 465, 469

[56] References Cited

U.S. PATENT DOCUMENTS 3,987,418  10/1976  Buchanan .......................... 364/200
4,488,230  12/1984  Harrison ............................ 307/465
4,501,977   2/1985  Koike ............................. 307/452 X

OTHER PUBLICATIONS

Cook et al., "1 μm MOSFET VLSI Technology-Part III-Logic Circuit Design Methodology and Applications", IEEE Transactions on ELECTRON Devices, Apr. 1979, vol. ed.-26, pp. 336-339.

Primary Examiner—Raulfe B. Zache
Assistant Examiner—Thomas C. Lee
Attorney, Agent, or Firm—Cahill, Sutton & Thomas

[57] ABSTRACT

The topography of a CMOS microprocessor chip includes address buffer circuitry along the bottom and lower left hand edges of the chip, data bus buffers disposed along the lower right hand edge of the chip, address register circuitry and an arithmetic logic unit contained in a register section adjacent to both the address buffer circuitry and data bus buffer circuitry, register transfer circuitry adjacent to and above the register section, P channel circuitry disposed directly above the register transfer circuitry for producing sum-of-minterm signals applied to the register transfer circuitry in response to the minterm signals produced by N channel circuitry disposed adjacent to and immediately above the P channel circuitry. Status register circuitry responsive to status register control logic disposed along the top edge of the chip is positioned in the register section for direct, low capacitance connection to the internal data bus. N and P MOSFETs in the N and P channel circuitry, respectively, are aligned so that polycrystaline silicon conductors of the minterm signals terminate on the gate electrodes of P channel MOSFETs above points at which sum-of-minterm signals are coupled to the register transfer circuitry.

2 Claims, 13 Drawing Sheets

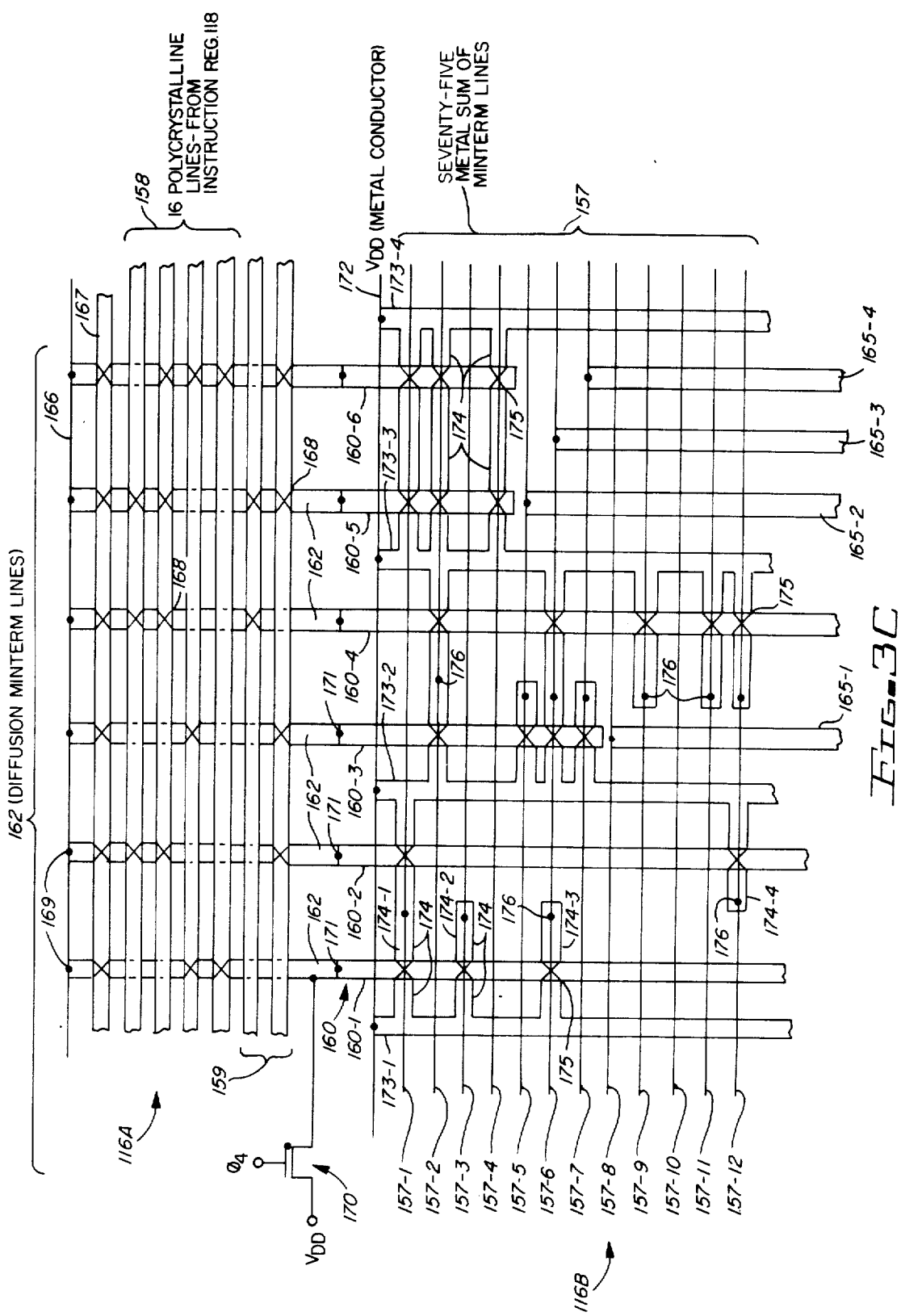

TOPOGRAPHY OF INTEGRATED CIRCUIT INCLUDING A MICROPROCESSOR

This is a continuation of application Ser. No. 534,181, filed Sept. 20, 1983, now U.S. Pat. No. 4,652,992.

BACKGROUND OF THE INVENTION

The invention relates to topography for integrated circuit microprocessor chips.

The size of an integrated circuit, i.e., the "chip size" is an important factor in the ultimate cost of the integrated circuit to the final user. Another important cost is the engineering and design cost. The larger the number of units of the integrated circuit which are manufactured per wafer, the smaller are the engineering and design costs per unit. However, the chip size becomes an increasingly dominate factor in the ultimate product cost as the manufacturing volume of the product increases. For state of the art CMOS (complementary metal-oxide-semiconductor) and MOS (metal-oxide-semiconductor) large scale integrated (LSI) devices, very large numbers of MOSFET's (metal-oxide-semiconductor field effect transistors) are fabricated on a single monolithic silicon "chip", which is frequently less than 200 mils square. Thousands of conductive lines, some composed of polycrystaline silicon, others composed of aluminum, and others composed of diffused regions within the silicon, interconnct the electrodes of the various MOSFETs. Minimum line widths and spacings between the respective lines and the MOSFETs must be maintained to avoid short circuits and parasitic effects despite slight variations in the manufacturing process due to presence of minute, even submicron, particulates that are invariably present in the semiconductor processing facility. Yet the length of the interconnecting lines and their associated capacitanaces must be minimized, not only to reduce chip size, but also to achieve maximum circuit operating speeds. A wide variety of trade-offs, including the necessity to minimize chip size, obtain a suitable chip aspect ratio (which enhances integrated circuit chip yield and wire bonding yield), increase circuit operating speed, reduce power consumption, and achieve acceptable reliability are all involved in obtaining an optimum "layout" or topography of the MOSFETs and the interconnection pattern therebetween in order to obtain an MOSLSI circuit which is both economical and has acceptable operating characteristics. Often, the technical and commercial success of an electronic product utilizing MOSLSI technology may hinge on the ability of the chip designer to achieve an optimum chip topography.

A very high level of creative interaction between the circuit designer and the chip designer or layout draftsman is required to achieve a chip topography or layout which enables the integrated circuit to have acceptable operating speed and power dissipation and yet is sufficiently small to be economically feasible. Months of such interaction resulting in numerous trial layout designs and redesigns and circuit design revisions may be required to arrive at an optimum topography for a single MOSLSI chip. Although the computer aided design (CAD) approach in the past has been attempted in order to generate optimum MOSLSI topography designs, this approach has been only moderately successful, and only to the extent that the CAD approach usually provides a rapid chip topography design. However, such a topography design usually results in less than optimum, or even mediocre performance and usually results in an unnecessarily large semiconductor chip. It is established in the integrated circuit industry that CAD approaches to generating MOSLSI chip layouts do not yet achieve the topography design optimization which can be accomplished by human ingenuity applied to the task.

Some of the numerous design constraints faced by the MOSLSI chip designer include specifications for minimum widths and spacings of diffused regions in the silicon, the minimum size required for contact openings in the insulating field oxide, the spacings required between the edges of contact openings to the edges of diffused regions, minimum widths and spacings of polycrystaline silicon conductors, the fact that such polycrystaline silicon conductors cannot "cross over" diffused regions in most silicon gate processes, the minimum widths of and spacings between the aluminum metalization conductors, and the constraint that conductors on the same layer of insulating oxide cannot cross over like conductors. The high amount of capacitance associated with diffused regions and the resistance of both diffused regions and polycrystaline silicon conductors must be carefully considered by the circuit designer and the chip designer in arriving at an optimum chip topography. For many types of logic circuits, such as the microprocessor of the present invention, an extremely large number of conductive lines between sections of logic circuitry are required. The practically infinite number of possibilities for routing the various conductors and placement of the various MOSFETs taxes the skill and ingenuity of even the most resourceful chip designers and circuit designers, and is beyond the capability of the most sophisticated computer programs yet available. Other constraints faced by the chip designer and circuit designer involve the need to minimize cross-coupling and parasitic effects which occur between various conductive lines and conductive regions. Such effects may degrade voltages on various conductors, leading to inoperative circuitry or low reliability operation under certain operating conditions.

In approximately 1976, an NMOS (N channel MOS) integrated circuit microprocessor referred to as the 6502 microprocessor was introduced to the market. Earlier, Motorola had introduced an NMOS integrated circuit microprocessor known as the 6800 microprocessor. The 6800 and the 6502 are similar in certain respects. U.S. Pat. No. 3,987,418 discloses the topography of the 6800. Some of the most basic features of the 6800 microprocessor topography were used in the 6502, including placement of the instruction decoder at the top of the chip as illustrated in FIG. 6 of that patent, placement of the instruction register to the left of the instruction decoder, placement of the address output buffers along the bottom and lower left hand sides of the chip, placement of the data bus buffers along the lower right hand side of the chip, and placement of the register sections and the arithmetic logic unit generally to the left of the data bus buffers in the lower portion of the chip. Nevertheless, many subtle changes in circuit design, logic design, and topography design were provided in the 6502 microprocessor. Both processors have been widely used. However, both microprocessors dissipate a high amount of operating power, and neither now can be considered to be state-of-the-art devices.

The CMOS (complementary MOS) integrated circuit technology has been known for many years. The popularity of this technology has gradually grown, due to the very low static or DC power dissipation of conventional CMOS circuits. Also, the operating speed of CMOS circuitry is usually somewhat higher than that of NMOS integrated circuitry. However, the manufacturing costs of CMOS integrated circuits are higher than for NMOS integrated circuits due to the greater complexity of this semiconductor manufacturing process. Furthermore, due to the need to provide so-called "P-tubs" in which the N channel MOSFETs must be diffused (whereas the P channel devices can be diffused directly into the substrate) CMOS integrated circuits generally have required larger chips than functionally equivalent NMOS circuits.

Nevertheless, it occurred to me that if a CMOS microprocessor pin-compatible with and software compatible with the "ancient" 6502 could be designed with greatly reduced power consumption, greatly increased circuit operating speeds, and with certain functional improvements, it might be readily received by the marketplace.

Therefore, it is an object of this invention to provide an improved CMOS microprocessor compatible with the 6502, having certain improved functional features, and having a topography which results in a much faster, lower power dissipation microprocessor chip that can compete very favorably in the marketplace with the NMOS 6502 microprocessor.

BRIEF DESCRIPTION OF THE DRAWINGS

FIG. 3C is a symbolic diagram useful in explaining certain features of the N-channel MOSFET read only memory, the P channel MOSFET read only memory, and instruction register features of the chip topography of the present invention.

SUMMARY OF THE INVENTION

Figure 1:
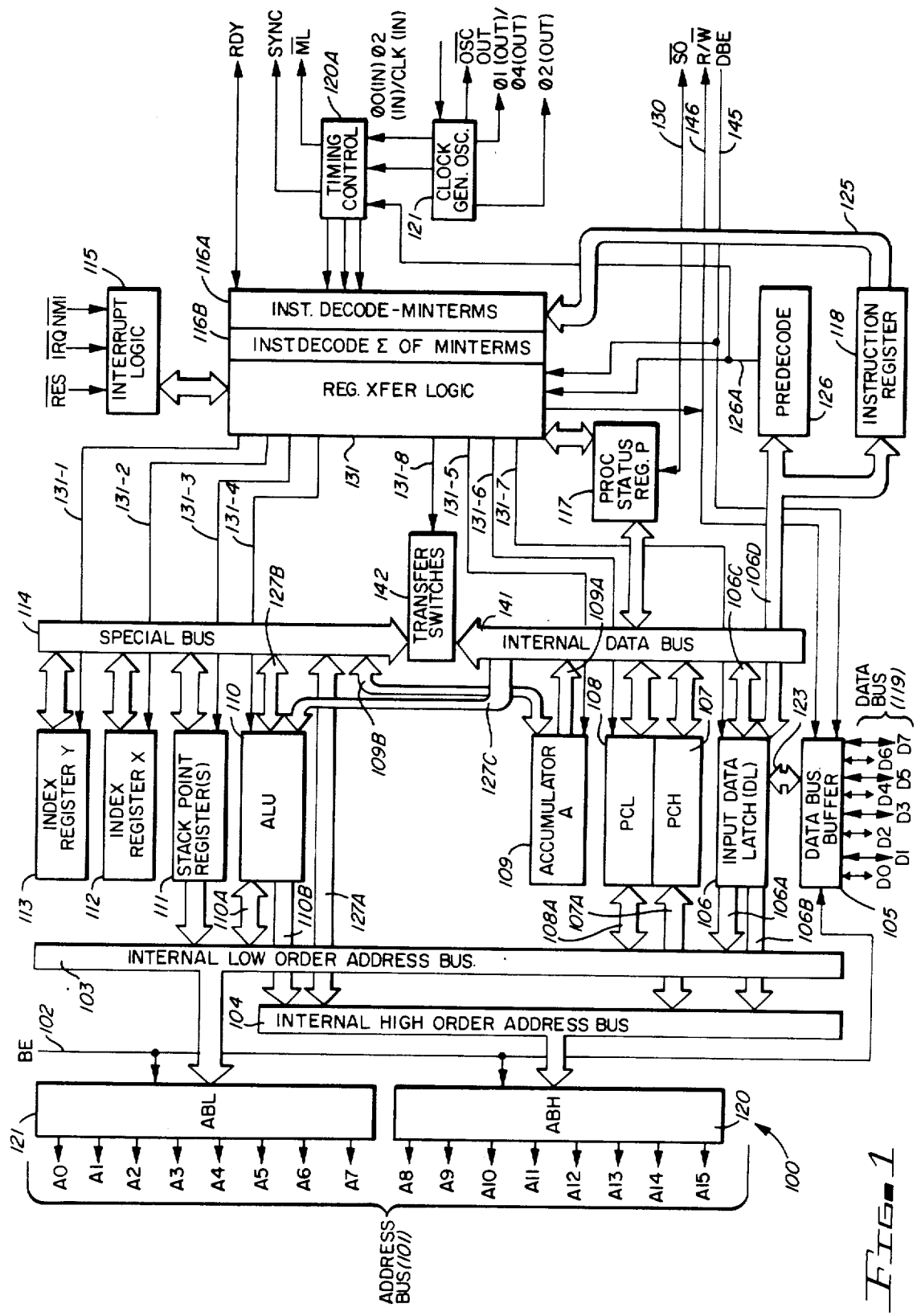
FIG. 1 is a block diagram of the integrated circuit CMOS microprocessor chip of the present invention.

Briefly described, and in accordance with one embodiment thereof, the invention provides an integrated circuit CMOS microprocessor chip having a surface with first, second, third, and fourth edges which circumscribe the microprocessor in a predetermined sequence, the first edge being defined as the bottom of the surface, the chip including a data bus, an address bus, a plurality of registers and an arithmetic logic unit contained in a "register region", address output buffer circuitry located along the first and second edges between those edges and the register section, which is adjacent to the address output buffer circuitry, instruction decoding circuitry located above and adjacent to the register region, wherein the instruction decoding circuitry includes a first read only memory array including an array of N channel MOSFETs arranged as vertical groups of series-coupled N channel MOSFETs for decoding instruction information in an instruction register to produce a plurality of minterm signals at the bottom of the first read only memory array, and wherein the instruction decoding circuitry also includes a second read only memory array including an array of P channel MOSFETs arranged as a plurality of horizontal groups of parallel-coupled P channel MOSFETs which receive and decode the various minterm signals to produce a plurality of sum-of-minterm signals which are coupled by means of polycrystaline silicon conductors or P-type diffused conductors which extend directly downward from the second read only memory array to register transfer latches which are located directly above and adjacent to portions of the register region in which the sum-of-minterm signals are required to effectuate execution of the present instruction. The data bus and address bus pass through the register region. In the described embodiment of the invention, the drains of the respective horizontal groups of parallel-coupled P channel MOSFETs are connected to a plurality of spaced horizontal metal conductors. The individual vertical groups of N channel MOSFETs and the individual horizontal groups of P channel MOSFETs and respectively positioned so as to cause each of a substantial majority of a plurality of the vertical minterm conducting polycrystaline silicon conductors, which form gate electrodes of the various P channel MOSFETs, to terminate, without extending lower into the second read only memory array, on a gate electrode of one of the P channel MOSFETs, the drain electrode of which is connected to a particular one of the spaced horizontal metal conductors that is located above another one of the spaced horizontal metal conductors that is conducting one of the sum-of-minterm signals which is conducted to a register transfer latch that in turn is located essentially directly beneath that minterm conducting polycrystaline silicon conductor and directly above the portion of the register section at which that one of the sum-of-minterm signals is required to effectuate execution of the present instruction.

DESCRIPTION OF THE INVENTION

FIG. 1 shows a block diagram of the CMOS microprocessor 100 of the present invention. This block diagram will be described in detail before explaining how the topography of these elements is implemented on the surface of a semiconductor chip in accordance with the present invention. Microprocessor 100 outputs sixteen addresses, A0–A15, which are capable of addressing 65,536 memory addresses, or locations. The address output conductors A0–A15 are generally designated by reference numeral 101. Address lines 101 are subdivided into low order address bus lines A0–A7 and high order address bus lines A8–A15. The low order address bus output buffer circuits are designated by reference numeral 121. The high order address output buffer circuits are designated by reference numeral 120. Microprocessor 100 includes an internal low order address bus 103 which is connected to the inputs of the low order address output latches 121, and also includes an internal high order address bus 104, which is connected to the inputs of the eight high order address output buffers 120.

The address output buffers 120 and 121 are set to a high impedance output state in response to the bus enable (BE) line 102.

Microprocessor 100 also includes eight bi-directional data bus conductors D0–D7, generally designated by reference numeral 119. The data bus conductors 119 are connected to the terminals of data bus buffer circuits contained in block 105. Bus enable conductor 102 is also connected to data bus buffer circuitry 105. A data bus enable (DBE) conductor 145 and a read/write (R/$\overline{\text{W}}$) conductor 146 are connected to data bus buffer circuitry 105. The bus enable signal 102 allows external control of the data bus buffers 105 and the address output buffers 120, 121. For normal operation, the BE signal is high, causing the address buffers 120, 121 and the R/$\overline{\text{W}}$ signal to be active and also causing the data buffers and circuitry 105 to be "active" during a wire cycle. When external control of the address lines 101 is desired, the bus enable signal DE is held low to disable the address output buffers by producing a high impedence output state on the address buffers 120, 121. The data bus enable (DBE) signal allows external control of the 3-state data output buffers contained in block 105. During normal operation, DBE would be driven by the phase two ($\phi$2) clock, thereby allowing data to be input to the microprocessor only during $\phi$2. During a read cycle, the data bus output buffers are internally disabled to produce very high output impedance. To disable the data bus externally, DBE should be held low.

The internal low order address bus 103 not only performs the function of conducting information from the various registers (subsequently described) into the low order address bus buffers 121, it also performs other internal functions, namely conducting intermediate results between registers. Low order address bus 103 is bi-directionally coupled to low order program counter 108 by means of conductors 108A. Similarly, high order address bus 104 is bi-directionally coupled by conductors 107A to high order program counter 107. Although much of the address information for the internal address buses 103, 104 comes from the two program counters 107 and 108, there are other sources for address information. For example, arithmetic logic unit 110 is coupled to low order address bus 103 by conductor 110A and to high order address bus 104 by conductor 110B. Stack pointer register 111 is coupled directly to low order address bus 103. Data input latch 106 is a source of address information for both low order address bus 103 and high order address bus 104 via conductors 106A and 106B, respectively. This is useful for certain direct page addressing modes wherein the second byte of an instruction is the only address required for that instruction, in which case the instruction is entered into input data latch 106 via conductors 123 and is transferred to the appropriate low order address bus 103 and high order address bus 104. In an absolute addressing mode, the third byte contains the high order address bits, which are received via data bus buffer 105 and transferred to input data latch 106 enter ouput via conductors 106B onto high order address bus 104.

Data bus buffer circuitry 105 receives all of the basic information for microprocessor 100 in the form of op codes, addresses and operands. Data bus buffer 105 then supplies such information to input data latch 106 via internal bus 123, from which the information can be transferred to the low and high order address buses 103 and 104, as previously explained, or to internal data bus 141 via conductors 106C, or to pre-decode circuitry 126 or instruction register 118 via conductors 106D. Pre-decode circuit 126 actually is a subsection of instruction register 118, and generates control signals to register transfer logic circuitry 131 and to timing control circuitry 120 in response to the present instruction. Thus, it can be seen that the data input latch 106 handles all data received from the data bus conductors 119, and has four outgoing data paths, two to the internal address buses, one to the internal data bus 141, and one to the pre-decode and instruction register circuitry.

The combination of the low order and high order program counters 108 and 107 function as a sixteen bit program counter which allows microprocessor 100 to address sixty-four kilobytes of memory. Its only function is to provide sequential addresses for the program being executed.

Accumulator 109 is an eight bit accumulator that contains the results of all data operations. Accumulator 109 is connected to internal data bus 141 by means of conductors 109A and is also connected to an additional special internal bus 114 (which, like internal data bus 141, has eight conductors), by conductors 109B. Special bus 114 (which also has eight conductors, as do address buses 103 and 104) and internal data bus 141 can be controllably coupled together by means of bi-directional switches in transfer block 142 which are responsive to decoding of the instructions. Reference numeral 109B designates eight data conductors which can conduct data from accumulator 109 to special internal bus 114.

Arithmetic logic unit (ALU) 110 performs all of the basic logic operations such as addition, subtraction, multiplication, exclusive ORing, logical ANDing, logical ORing, bit testing, etc. Arithmetic logic unit 110 can also compute addresses, which is why it has connections to both the high order and low order internal address buses 103 and 104 via bus connections 110C and 110B, respectively. Arithmetic logic unit 110 also is connected to data bus 141 by means of connections 109A and to special bus 114 by means by connections 109B.

Stack pointer register 111 keeps track of stack locations in memory and points to them. Microprocessor 100 includes two index registers 112 and 113, each of which is bi-directionally coupled to special bus 114, enabling a software program to simultaneously point to two different software tables. Internal bus 114 is also coupled to high order internal address bus 104 by conductors 127A. All of the above identified registers and the arithmetic logic unit are eight bit devices.

Reference numeral 117 designates an eight bit register referred to as the status register. It contains individual status "flag" for indicating the status of microprocessor 100. These flags include a carry bit, a "zero" bit, an interrupt mask bit, a decimal mode bit, a software break command bit, an overflow bit, and a negative number indicator bit. The overflow bit in process status register 117 can be set by a set overflow ($\overline{SO}$) signal on conductor 130. This allows certain bit manipulation operations to be performed and allows branching operations based on the state of the overflow status bit. The basic timing ciruitry for microprocessor 100 is contained in clock generator circuit 124. The basic timing of microprocessor 100 is that addresses are output during $\phi 1$. During $\phi 2$ data is transferred to external data bus conductors 119. $\phi 4$ is utilized to established internal timing waveform edges which minimize the amount of internal logic circuitry associated with addressing certain dynamic random access memories requiring a row address strobe (RAS) signal and a column address strobe (CAS) signal. The $\overline{OSC}$ (OUT) signal is at the output of an inverter having its input connected to the $\phi 0(IN)/\phi 2(IN)/CLK(IN)$ signal to provide enough gain to provide oscillation using an external crystal. (Note that $\phi 0(IN)$, $\phi 2(IN)$ and CLK(IN) are simply abreviations of alternate clock signals that can be applied to this input of the clock generator circuitry.) The $\phi 1(OUT)$ signal is the inverted $\phi 2(OUT)$ signal to provide timing for external R/$\overline{W}$ operations.

In block 120A, a timing control or timing generator circuit has eight timing states which are stepped through in sequence. This circuit is reset each time a new instruction is begun and is incremented in accordance with the number of cycles, from one to eight, required for execution of that instruction. The outputs of timing control circuit 122 are connected to the input of instruction decode circuitry 116A,B. These signals, in conjunction with the output signals from instruction register 118 on conductors 125, are operated upon by the instruction decoder minterm circuitry 116A to generate intermediate signals needed to produce register transfer signals required to execute the present instruction.

The read/write (R/$\overline{W}$) signal is normally in the high state, indicating that microprocessor 100 is reading data from memory or from an input-output bus. In the low state of the read/write signal, the data bus valid data to be output from the microprocessor to the addressed memory location. The read/write conductor 146 can be set to a "high impedance output state" by the bus enable signal on conductor 102.

The SYNC signal output by timing control circuit 122 is provided to identify cycles of instruction execution during which microprocessor 100 is doing an op code fetch. If the ready (RDY) line is pulled to a low state level during the $\phi 1$ clock pulse in which the SYNC signal went high, microprocessor 100 will step in its current state and will remain in that state until the RDY line goes high, whereby the SYNC signal can be used to control the RDY signal so that it causes single instruction execution.

The memory lock ($\overline{ML}$) signal output by timing control circuit 122 indicates the need to defer the rearbitration of the next bus cycle to ensure the integrity of read-modify-write instructions. The $\overline{ML}$ signal goes low during ASL, DEC, INC, LSR, ROL, ROR, TRB and TSB memory referencing instructions, which are well known to those in the art familiar with programming of the 6502 microprocessor.

Interrupt logic circuitry contained in block 115 has outputs connected to the register transfer logic 131. The interrupt request (IRQ) signal requests an interrupt sequence to be executed by microprocessor 100. If the interrupt flag in processor status register 117 is zero, that current instruction is completed and the interrupt sequence begins during $\phi 1$. The program counter and process status register contents are stored in a "stack" in external memory. The microprocessor then will set the interrupt mask flag high so that no further interrupts may occur. At the end of the cycle, the low order program counter register 108 will be loaded from the hexadecimal address FFFE, and the high order program counter 107 will be loaded from the hexadecimal location FFFF, thereby transferring program control to the memory vector located at these addresses. The RDY signal must be in the high state for any interrupt to be recognized. The non-maskable interrupt ($\overline{NMI}$) input to interrupt logic 115 makes interrupt requests (by means of a negative-going edge) that a non-maskable interrupt sequence be generated within the microprocessor 100. The $\overline{NMI}$ signal is sampled during $\phi 2$. The current instruction is completed and the interrupt sequence begins during the following $\phi 1$ pulse. The program counter is loaded with the interrupt vector from locations FFFA for the low order byte and FFFB from the high order byte, thereby transferring program control to the non-maskable interrupt routine.

The reset (RES) input to interrupt logic 115 causes an initialization sequence to begin by means of a positive transition from a $\overline{RES}$ input signal. The reset signal must be held low for at least two clock cycles after the power supply voltage $V_{DD}$ reached its operating voltage from a power down condition, after which time R/$\overline{W}$ is high and SYNC is low. When a positive edge is detected on the $\overline{RES}$ line, an initialization sequence lasting six clock cycles occurs. The interrupt mask flag is set, the decimal mode bit of the process status register 117 is cleared, and the program counter 108, 107 is loaded with the restart vector from the locations FFFC for the low order byte and FFFD for the high order byte, which is the start location for program control.

The result of decoding the present invention by means of the instruction decoding circuitry 116A and 116B produces signals which drive the register transfer logic circuitry 131. The output signals 131-1, 132-2 . . . 131-7 are coupled to the various registers, as shown in FIG. 1 and generate the necessary enable signals to effectuate transfer of the contents of the various registers and the arithmetic logic unit 110 from the various internal address buses 103 and 104, and internal data bus 141 and special bus 114. All control for transfering data between the various registers, the arithmetic logic unit and the various buses is accomplished by "register transfer signals" from the register transfer logic circuitry 131. The first level of instruction decoding, in instruction decoding circuitry 116A, generates 252 minterm signals. The second level of decoding in block 116B produces 74 "sum-of-minterm" signals which are used to set or reset clocked latches contained in the register transfer logic circuitry 131. At the appropriate times, the states of these latches are output in response to appropriate clock signals to produce the register transfer signals that actually affectuate the various data transfers between the registers, arithmetic logic unit, and bases to execute the present instruction.

Figure 2:
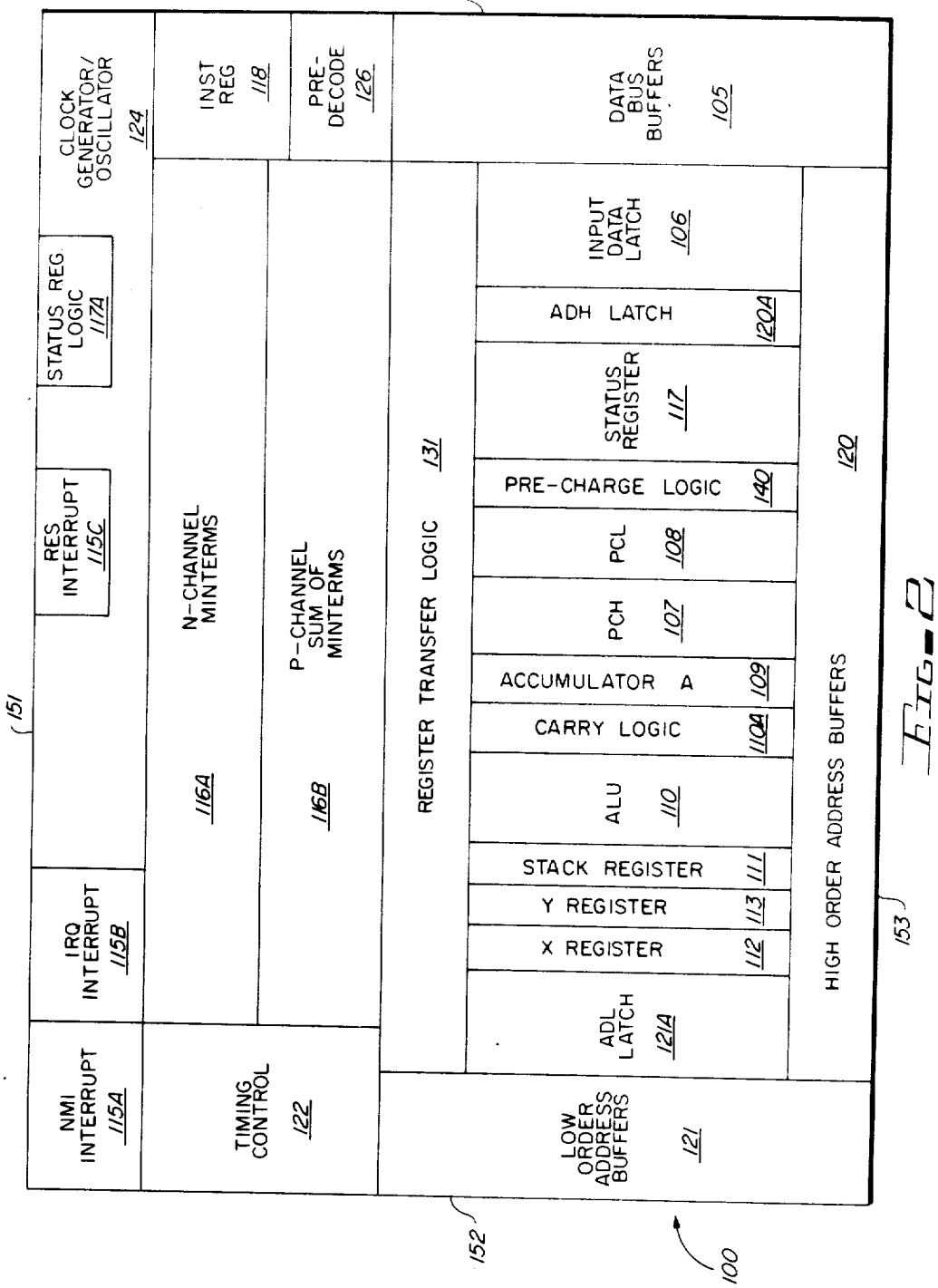
FIG. 2 is a block diagram illustrating the general location of major circuit sections on the integrated circuit CMOS microprocessor chip of the invention.

Next, the topography of microprocessor chip 100 will be described with reference to FIG. 2. In FIG. 2, reference numeral 100 designates the microprocessor in the surface of a semiconductor chip having four edges which appear in FIG. 2 as top edge 151, left edge 152, bottom edge 153 and right edge 154. The locations of the various blocks of circuitry on the chip shown in FIG. 1 are generally indicated in FIG. 2 by the same reference numerals used in FIG. 1. The low order address buffer area 121 appears in an elongated rectangular area located at the lower left hand edge 152 of microprocessor chip 100. It is approximately 15 mils wide. The high order address buffer circuitry 120 lies in a horizontally elongated area along bottom edge 152 of microprocessor chip 100, extending from the address buffer area 121 to the edge of an area 105 containing the data bus buffers 105 of FIG. 1, which in turn occupy a vertically elongated area that lies along the lower half of edge 154. The height of area 120 is approximately 15 mils. The vertical dimension and horizontal dimension of microprocessor chip 100, as its layout appears in FIG. 3, is 127 mils×147 mils respectively.

Register transfer logic circuitry 131 of FIG. 1 appears as a horizontally elongated area 131 in FIG. 2 extending horizontally from approximately the top of low order address buffer area 121 to the top of data bus buffer circuitry 105. The low order address buffer circuitry 121, high order address buffer circuitry 120, data bus buffer circuitry 105, and register transfer logic circuitry 131 enclose a large rectangular area, referred to herein as the "register section", in which all of the above-mentioned registers and the arithmetic logic unit are disposed. Address latching circuitry 121A is shown in FIG. 2 adjacent to low order address buffer circuitry 121. Address latch circuitry 121A actually is included within low order address buffer circuitry 121 and high order address buffer circuitry 120 as shown in FIG. 1, but is separated out and shown adjacent to low order address buffer circuitry 121 as shown in FIG. 2 for purposes of describing the topography of MOS microprocessor ship 100. Address latch circuitry 121A is approximately 16 mils wide by 40 mils high. Index register circuitry 112 appears as a vertically elongated area approximately 40 mils high and 2.5 mils wide immediately adjacent to the right hand edge of address latch circuitry 121A. Index register 113, of the same dimensions, is disposed immediately adjacent to the right hand side of index register circuitry 112. Next, the stack register circuitry 111, approximately 40 mils high and 5 mils wide, is disposed adjacent to the right hand side of index register circuitry 113. Next, the arithmetic logic unit circuitry 110 is positioned immediately to the right of stack register circuitry 111. Its width is approximately 25 mils Carry logic circuitry 110A, which for purposes of describing the topography of microprocessor chip 100 is shown separately from arithmetic logic unit circuitry 110, is disposed immediately to the right of arithmetic logic unit circuitry 110. Its width is approximately 7 mils (In FIG. 1, carry logic 110A is included in block 110.) Next, the circuitry constituting accumulator 109 is disposed immediately on the right hand side of carry logic 110A, and is approximately 5 mils in width. The high order program counter circuitry 107 is approximately 10 mils wide, and is disposed on the right hand side of accumulator 109. The low order program counter 108 is approximately 10 mils wide, and is disposed on the right hand side of high order program counter 107. Next, the precharge logic, which is not shown in FIG. 1 but is essential to the described implementation of microprocessor chip 100, is approximately 6 mils wide, and is disposed on the right hand side of low order program counter circuitry 108. As is well known to those skilled in the art, precharge circuitry is required to set initial values of certain conductors in dynamic MOS logic circuitry. This circuitry is used to preset the data bus conductor and address bus conductor lines which are designated by reference numerals 103, 104, 114, and 141 in FIG. 1 to initial values at the beginning of various operation cycles.

Next, status register circuitry 117 of FIG. 1 is approximately 14 mils wide, and is disposed immediately on the right hand side of precharge logic circuitry 140. The position of this status register circuitry is a marked difference from the previously described prior art NMOS microprocessor circuit. The significance of this difference will be explained in detail subsequently. Next, the high order address latch circuitry 120A, which has been separated from high order address buffer circuitry 120 in FIG. 2 for purposes of description of the microprocessor chip topography, is approximately 6 mils wide, and is positioned on the right hand side of status register circuitry 117. Input data latch circuitry 106 is approximately 13 mils wide, and is disposed on the right hand side of high order address latch circuitry 120A. Data bus buffer circuitry 105 is approximately 16 mils wide.

Immediately above register transfer logic circuitry 131 is an area 116B, in which a read only memory or "programmed logic array" (PLA) consisting of P-channel MOS field effect transistors (MOSFETs) is disposed. The width of this section is approximately 125 mils and its height is approximately 16 mils Immediately above area 116B is an area 116A containing only N channel MOSFETs arranged is a second program logic array which generates "minterms" in the process of decoding instructions input thereto from instruction register 118. Area 116A is approximately 21 mils high by 125 mils wide. Register transfer logic area 131 is approximately 15 mils high by 125 mils wide. Instruction register 118, including pre-decode circuitry 126, is located at the right hand end of N channel area 116A, which is approximately 12 mils wide and approximately 55 mils high.

Figure 3A:
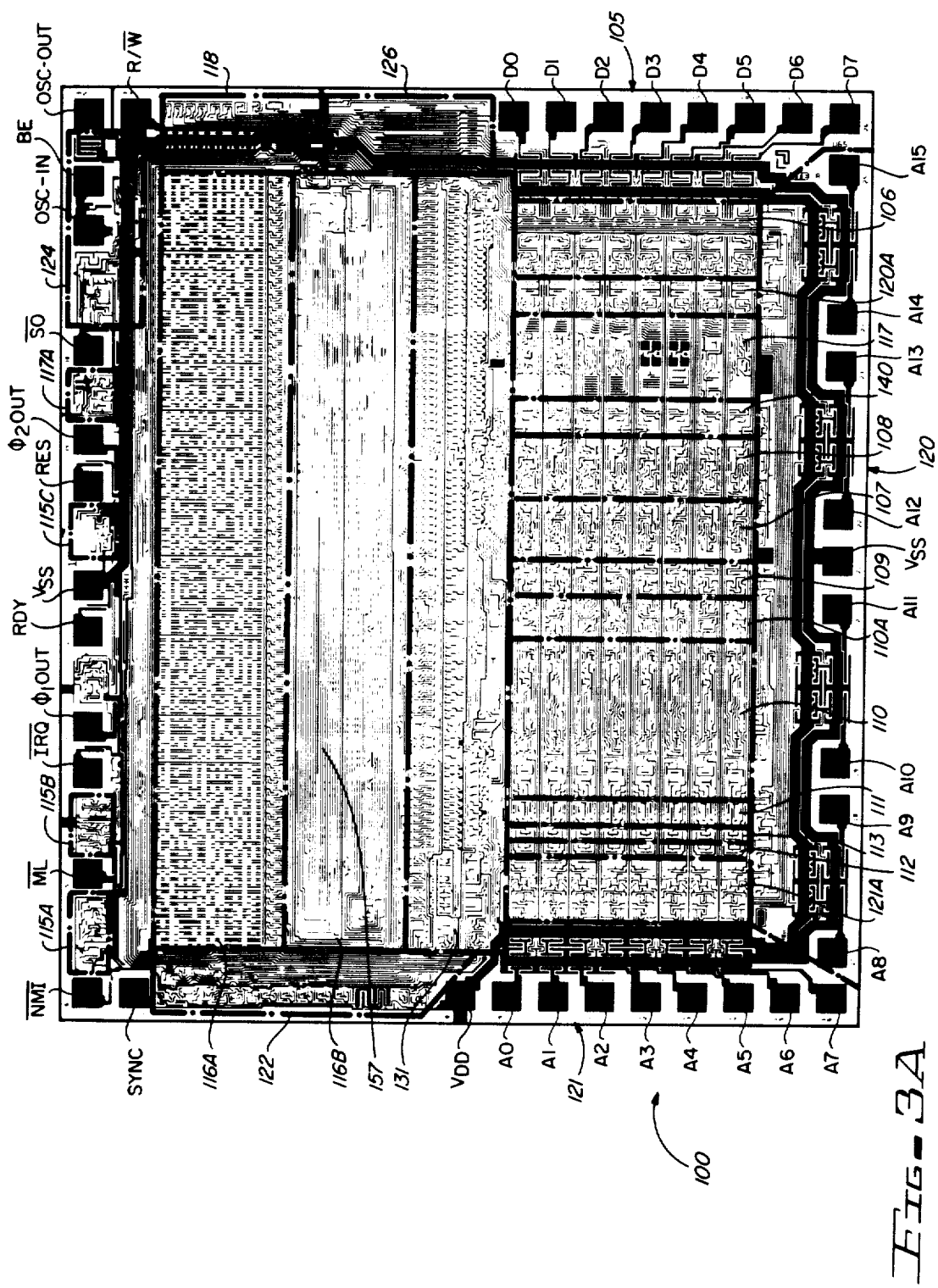
FIG. 3A is a scale image of a photo mask used to pattern the interconnect metal during manufacture of the CMOS microprocessor chip of the present invention, with the major sections shown in FIG. 2 blocked out in heavy lines.
Figure 3B:
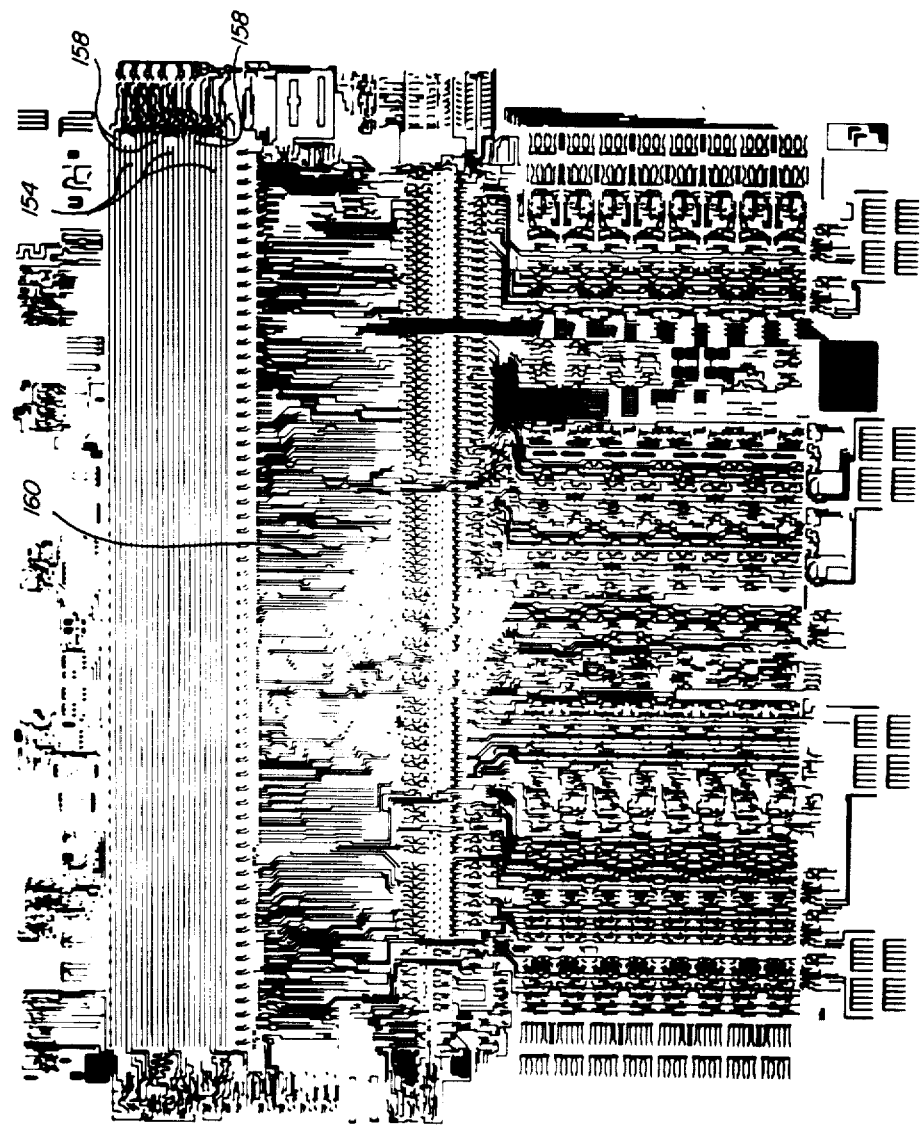
FIG. 3B is a scale image of a photo mask used to pattern a polycrystaline silicon layer on the CMOS microprocessor chip of the present invention, with additional indicia useful in explaining certain features of the present invention.
Figure 4:
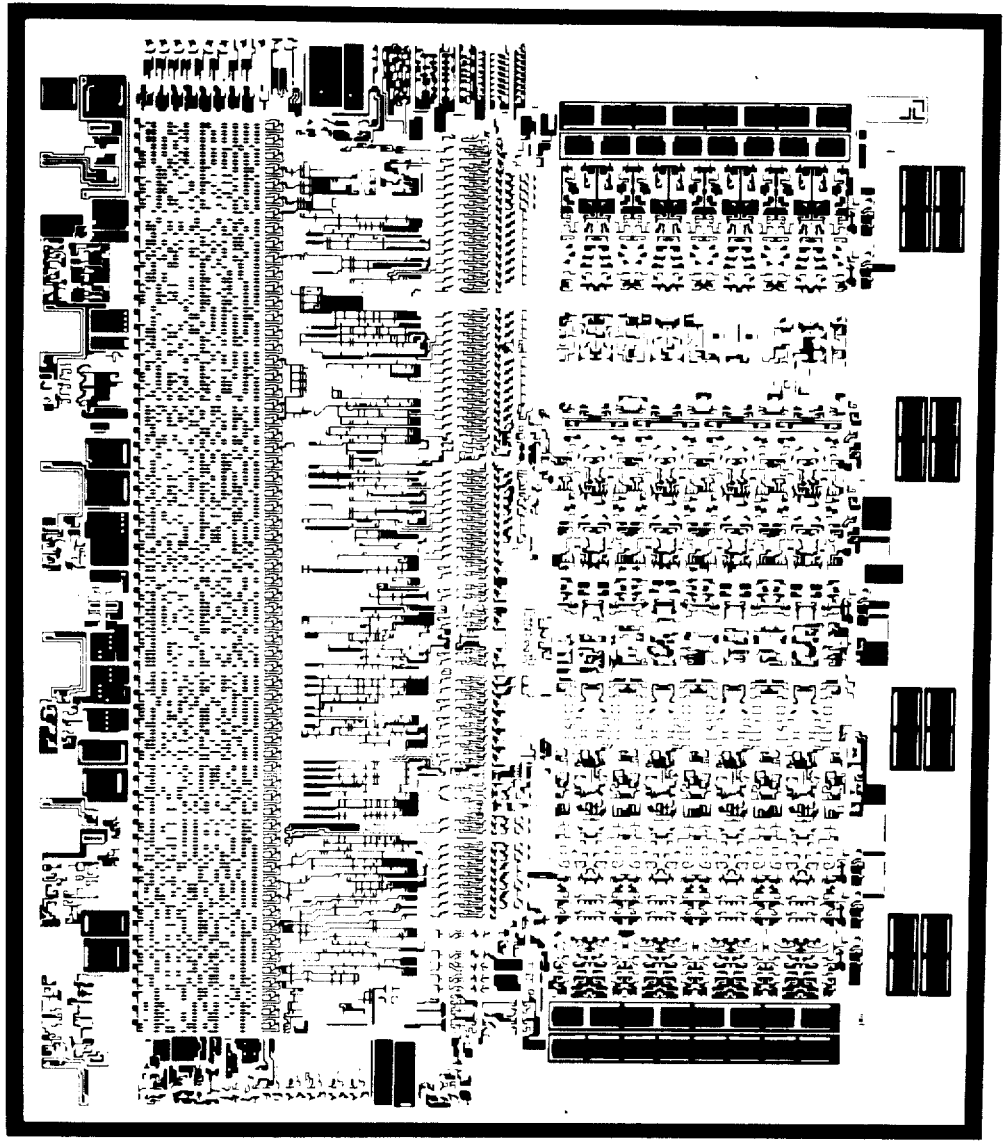
FIG. 4 is a scale image of a photo mask used to define the diffusion regions during manufacture of the CMOS microprocessor chip of the present invention.
Figure 5:
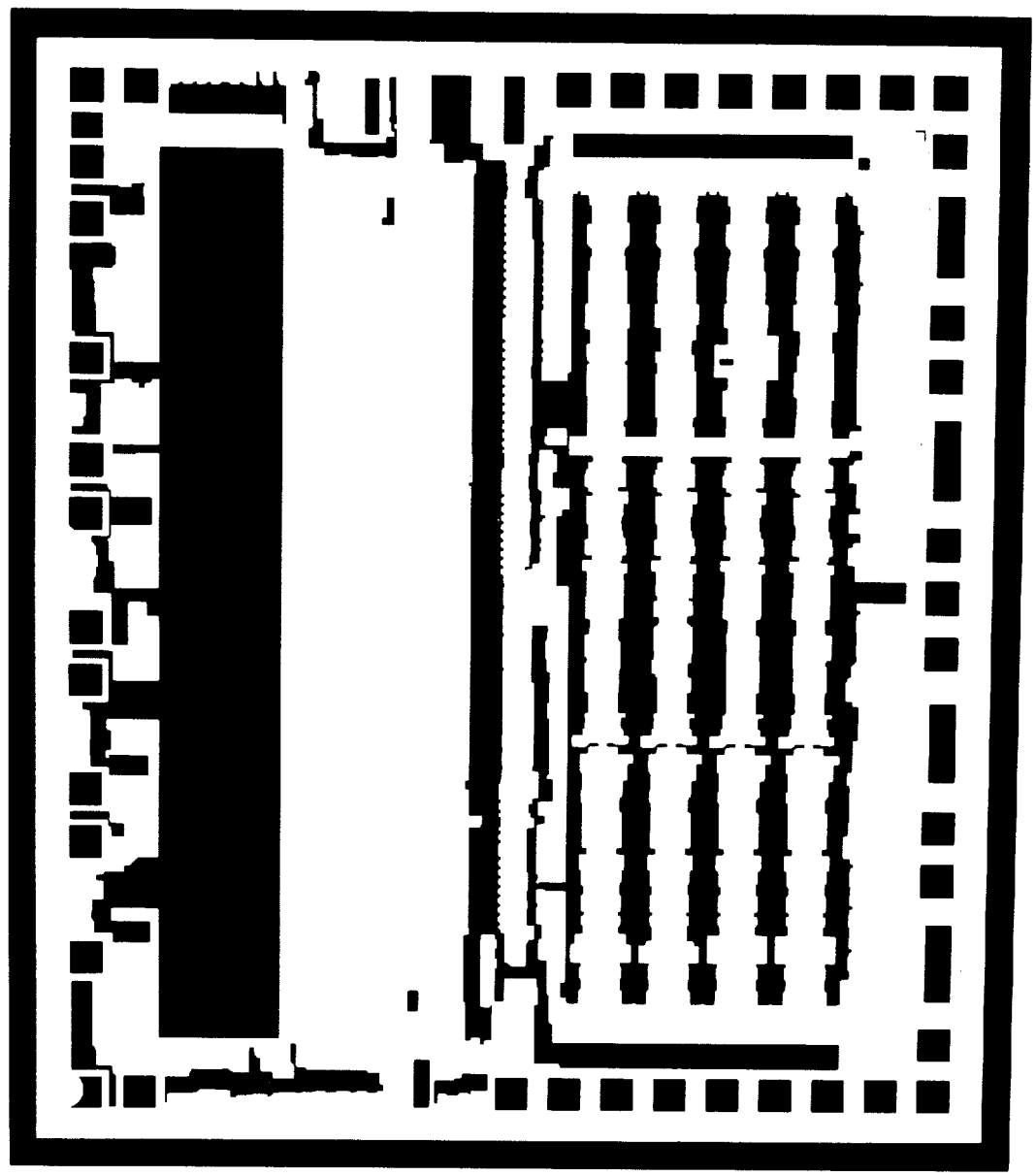
FIG. 5 is a scale image of a photo mask defining regions in which N channel MOSFETs can be produced on the chip.
Figure 6:
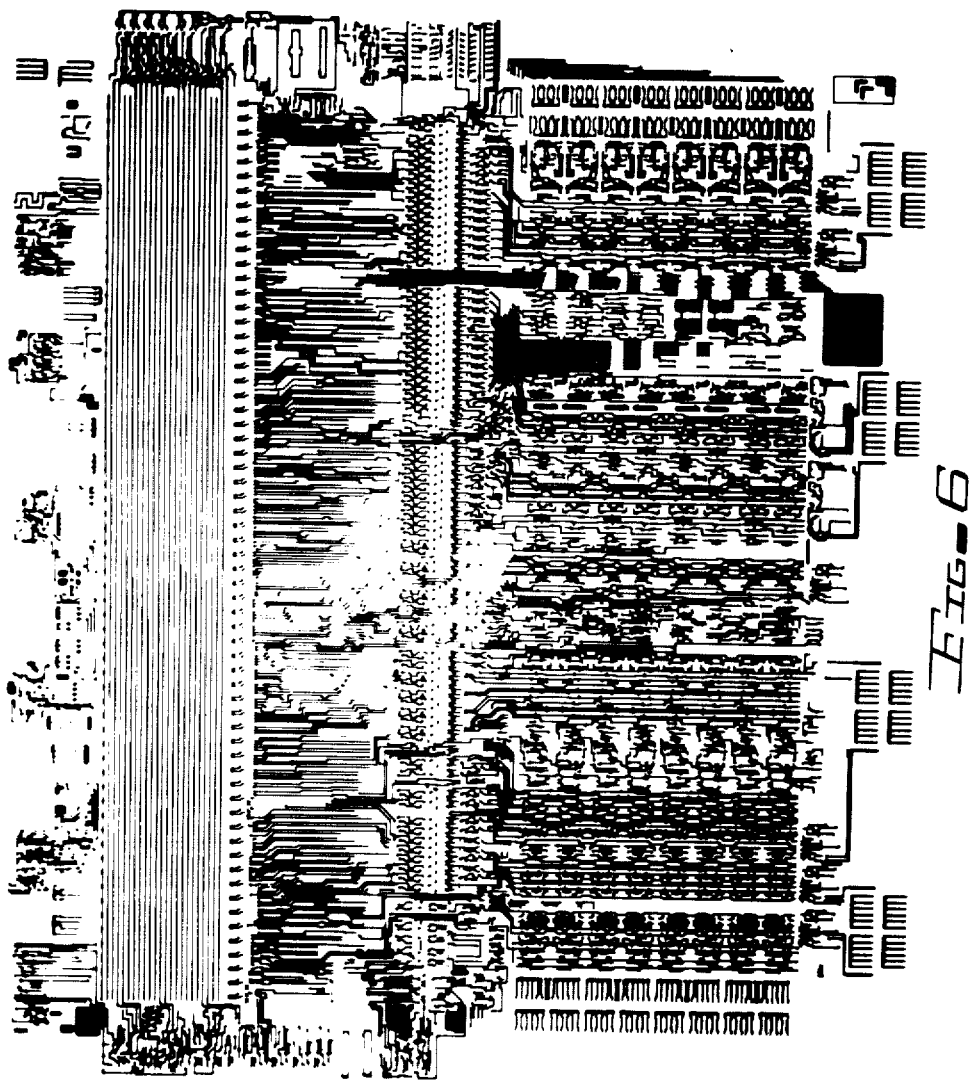
FIG. 6 is a scale image of a photo mask used in defining the polycrystaline silicon layer of the CMOS microprocessor chip.
Figure 7:
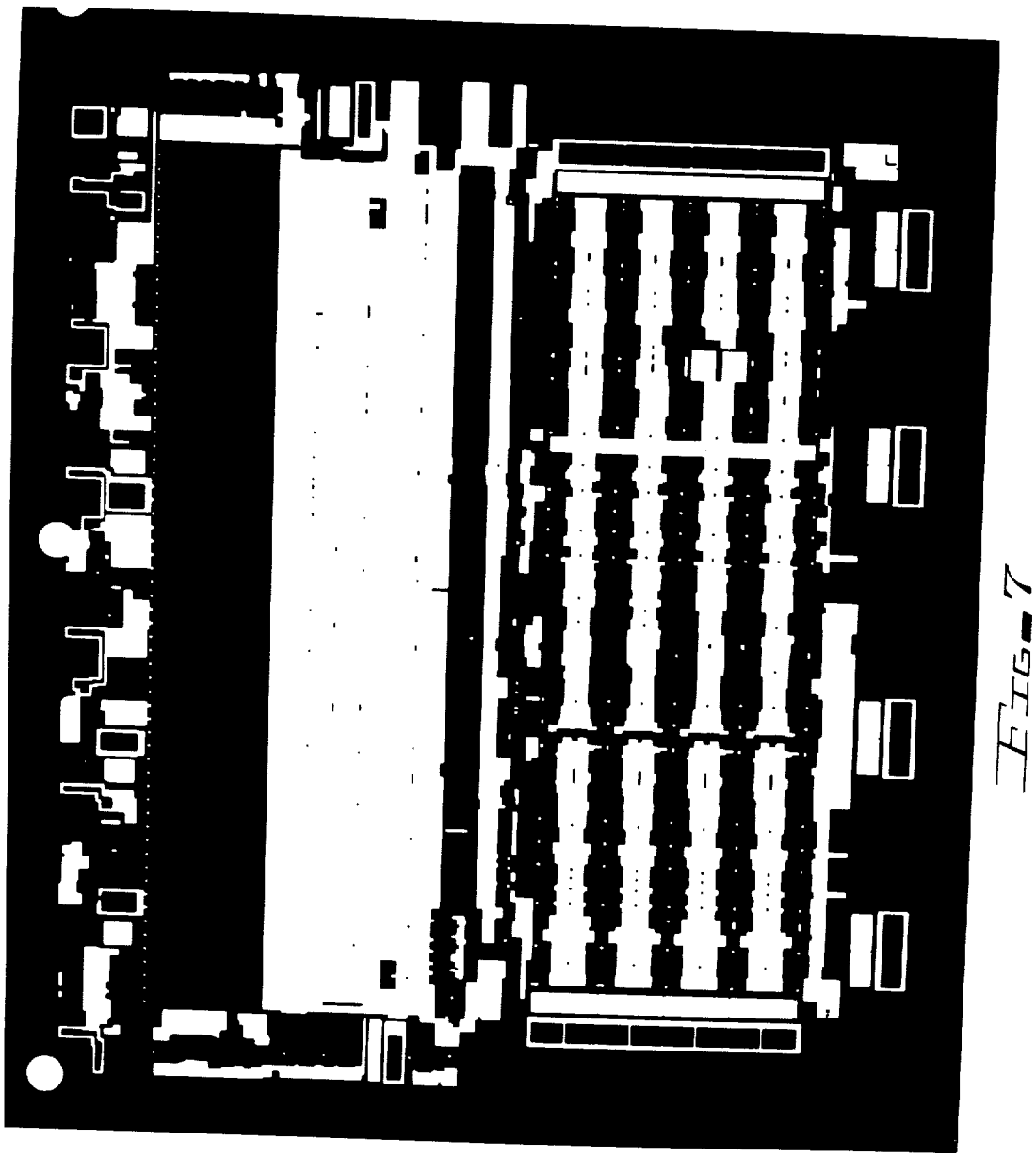
FIG. 7 is a scale image of a photomask used in defining the N-type diffused regions in the chip.
Figure 8:
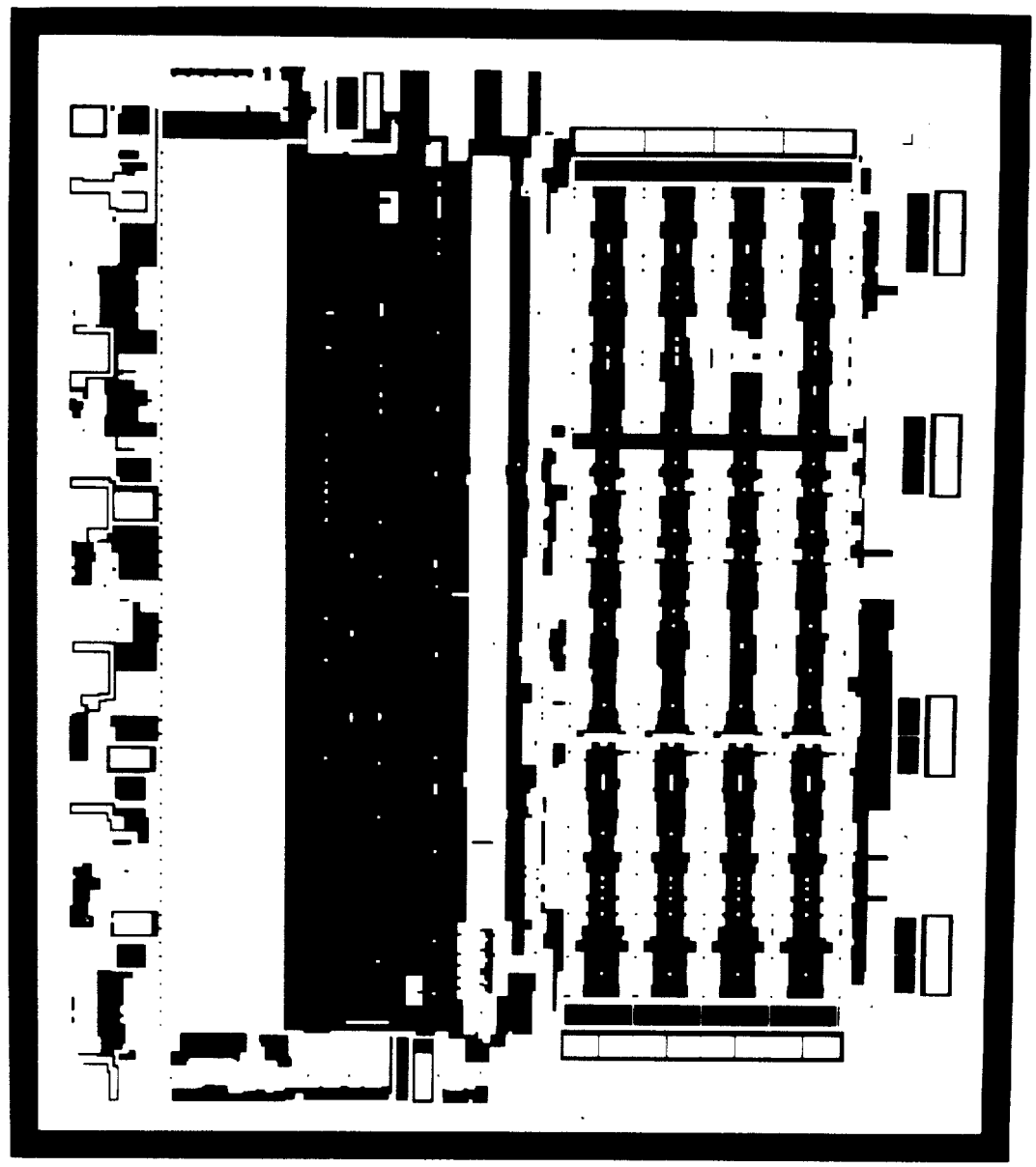
FIG. 8 is a scale image of a photo mask used in defining the P-type diffused regions in the chip.

Incidentally, it can be easily seen in FIG. 3A that many bonding pads which are located around the periphery of microprocessor chip 100 are not shown in FIG. 2. These bonding pads are included in the various areas, such as data bus buffers 105, high order address buffers 120, etc., which provide signal communication between microprocessor chip 100 and the "outside world".

At the left hand end of N channel area 116A and P channel area 116B, timing control circuitry 120 is disposed, and extends out to approximately the left hand edge 152 of CMOS microprocessor chip 100. The dimensions of timing control circuitry 120 are approximately 10 mils×48 mils.

The interrupt circuitry shown in FIG. 1 is distributed along the top edge 151 of microprocessor chip 100 as shown in FIG. 2. More specifically, the NMI interrupt circuitry 115A is disposed in the upper left hand corner of the chip. Its dimensions are approximately 14 mils wide and 6 mils high. IRQ (interrupt request circuitry 115B is located immediately to the right of NMI interrupt circuitry 115A, and is approximately 12 mils wide×8 mils high. The reset circuitry included in block 115 of FIG. 1 is positioned further to the right along top edge 151 of microprocessor chip 100, and is designated by reference numeral 115C. Its dimensions are approximately 8 mils by 10 mils The status register logic 117A which simply performs as an input buffer circuit for the signal $\overline{SO}$, described previously. It is located immediately on the left hand side of clock generator oscillator circuitry 124 along edge 151. Clock generator/oscillator circuitry 124 is approximately 32 mils wide and 12 mils high, and is located in the upper right hand corner of chip 100.

My prior attempts at using a PLA (program logic array) or read only memory approach to instruction decoding for NMOS microprocessors failed. After these prior attempts, I realized that inherent in use of an NMOS read only memory structure to accomplish initial logical "ANDing" to produce minterms from the eight bit instruction byte in the instruction decoder is the fact that the true output "minterm" signals would be at essentially ground volts. As will be readily apparent to one skilled in the art, in order to use logical "ANDing" to decode all of the possible instructions of the 6502 microprocessor, plus some additional instructions which I thought should be included to make a more flexible "6502-compatible" microprocessor, approximately 4096 (i.e., 256×16) separate minterms or columns of N channel MOSFETs would be required if this were to be accomplished in a single level of decoding. This was obviously unfeasible, so, as in all prior integrated circuit microprocessor instruction decoders, additional levels of decoding were added. My analysis and experiments led me to realize that is was totally impractical to use a read only memory to accomplish the second level of decoding, because each of the outputs of the first level (which in essence is an NMOS read only memory) must be inverted before a second level of logical ORing, i.e., decoding, can take place. The amount of chip area that would be required to perform this inversion of each of the outputs of the first read only memory level of decoding made this approach completely prohibitive. Therefore, the 6800 microprocessor, the 6502 microprocessor and all other prior microprocessors of which I an aware have all used "random logic" circuitry to implement subsequent levels of decoding which may be referred to as "sum-of-minterms" type of decoding. This type of "random logic" decoding circuitry inherently presents difficult challenges to the chip topography designer and the chip circuit designer.

However, I have found that if P channel MOSFET circuitry is utilized to accomplish the "sum-of-minterms" level of decoding, then the low or "negative" true logic levels output from the N channel or "minterm" level of decoding are at the proper level to represent a logic "1" input to a P channel PLA or read only memory. After three design and layout attempts, I managed to implement such decoding in the area designated by reference numeral 116B in FIGS. 2 and 3A.

Referring now to FIG. 3C, an abbreviated schematic diagram illustrating some of the features of implementation of the N channel read only memory section 116A and the P channel read only memory section 116B is shown in some detail.

In FIG. 3C, representative portions of "minterm decoding" array 116A and "sum-of-minterm decoding" array 116B are shown to help explain the topography design problem that is mostly solved by the present invention, and to also explain how the present invention succeeds in solving that problem. In minterm decoding array 116A, (also referred to as N-channel array 116A or as read only memory 116A) a metal $V_{SS}$ conductor 166 conducts the $V_{SS}$ or ground voltage to a two hundred fifty-two vertical N-type diffused regions 162 which are formed in a "p-tub" in the silicon substrate. A plurality of horizontal polycrystaline silicon lines 158 conduct the eight bits contained in instruction register 118 into minterm decoding array 116A. More precisely, there are sixteen of the horizontal polycrystaline silicon lines 158, representing the eight bits in instruction register 118 and their logical complements. Reference numeral 159 designates timing control lines which extend into minterm decoding array 116A from timing control circuitry 122. The eight possible states of timing control circuitry 122 are represented by digital logic levels on three of the six horizontal polycrystaline silicon lines 159, the logical complements thereof being represented by digital logic levels on the other three of the horizontal polycrystaline silicon lines 159.

The eight bits in instruction register 118 and the three states stored in timing control circuitry 122 thus are encoded by the N channel read only memory circuit or minterm decoding array 116A to produce two hundred fifty-two of the above-mentioned minterm signals on the lower ends of the diffused conductors 162.

At this point, those skilled in the art will realize that at each point where an N channel MOSFET transistor is formed in minterm decoding array 116A, there is a very thin "gate oxide" region over an area of the P tub region into which the vertical N-type diffusion regions 162 are made, and that there is a short gap between sections of the N-type diffused region 162 at the locations of the gate electrodes. These locations at which N channel MOSFETs are formed are designated by X's in minterm decoding array 116A of FIG. 3C. Reference numerals 168 designate several of these N channel MOSFETs.

Another horizontal polycrystaline silicon conductor 167 conducts the above-mentioned signal $\overline{\phi_4}$ into silicon minterm decoding array 116A. During "$\phi_4$ time", all of the N-type diffused regions 162 have their upper end connected to $V_{SS}$ conductor 166 because the upper row of N channel MOSFETs under polycrystaline silicon conductor 167 are turned on when $\phi_4$ is positive. During $\phi_4$ time, the lower end of each of the diffusions 162 are precharged to $V_{DD}$ by a plurality of P channel MOSFETs such as 170, only one of which is shown in FIG. 3C. One skilled in the art can readily see that each "column" of N channel MOSFET transistors in region 116A represents one minterm, and that a "true" minterm signal is produced on the lower end of the corresponding diffused region 162 if all of the N channel MOSFETs in that column are turned on by positive voltages on the corresponding ones of the polycrystaline silicon conductors 158 and 159. However, if a particular minterm is "false", then the lower end of the corresponding diffused region 162 remains at $V_{DD}$ volts.

Figure 9:
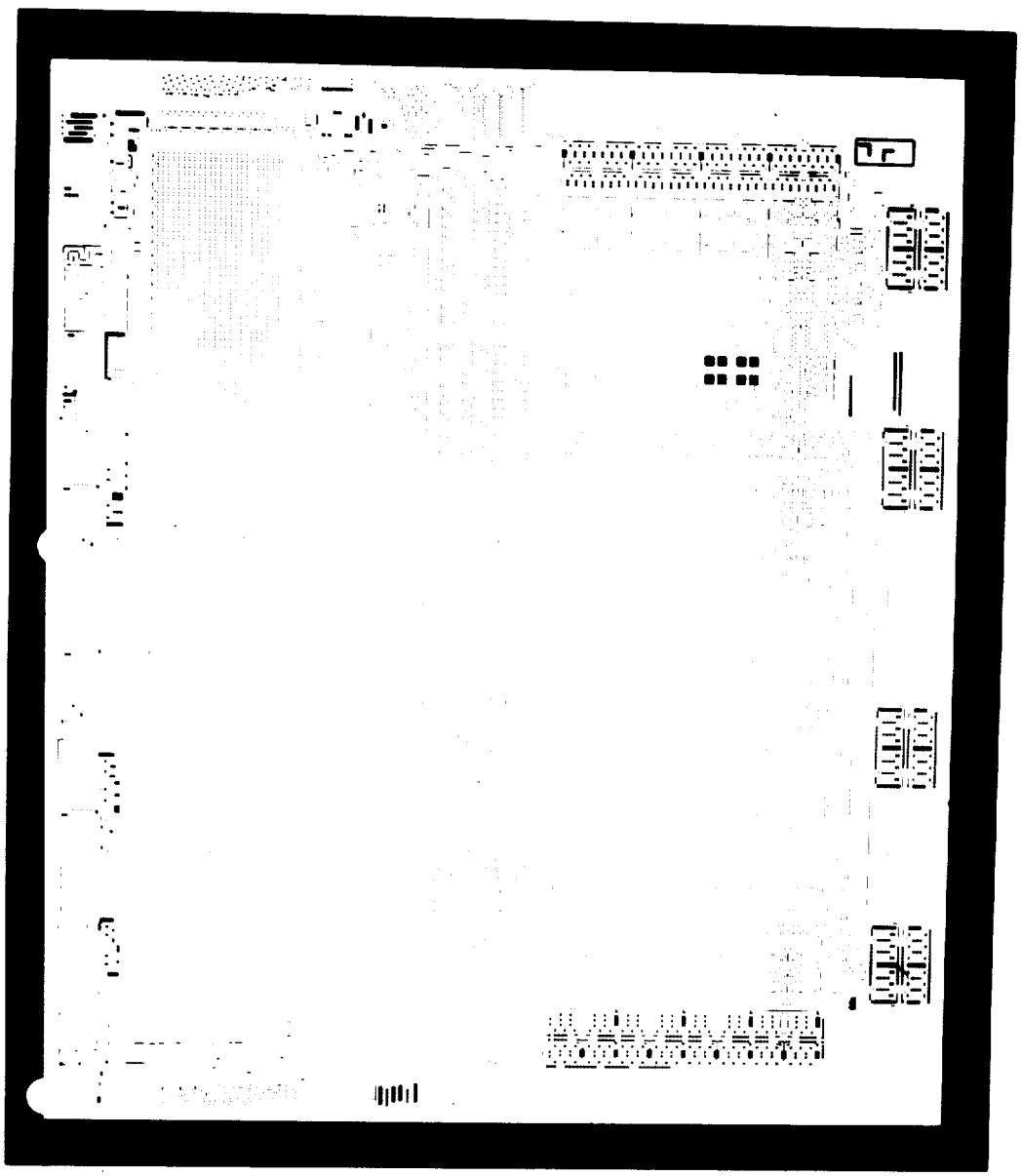
FIG. 9 is a scale image of a photo mask defining all metal-to-diffusion, metal-to-polycrystaline silicon, and polycrystaline-to-silicon contacts in the chip.
Figure 10:
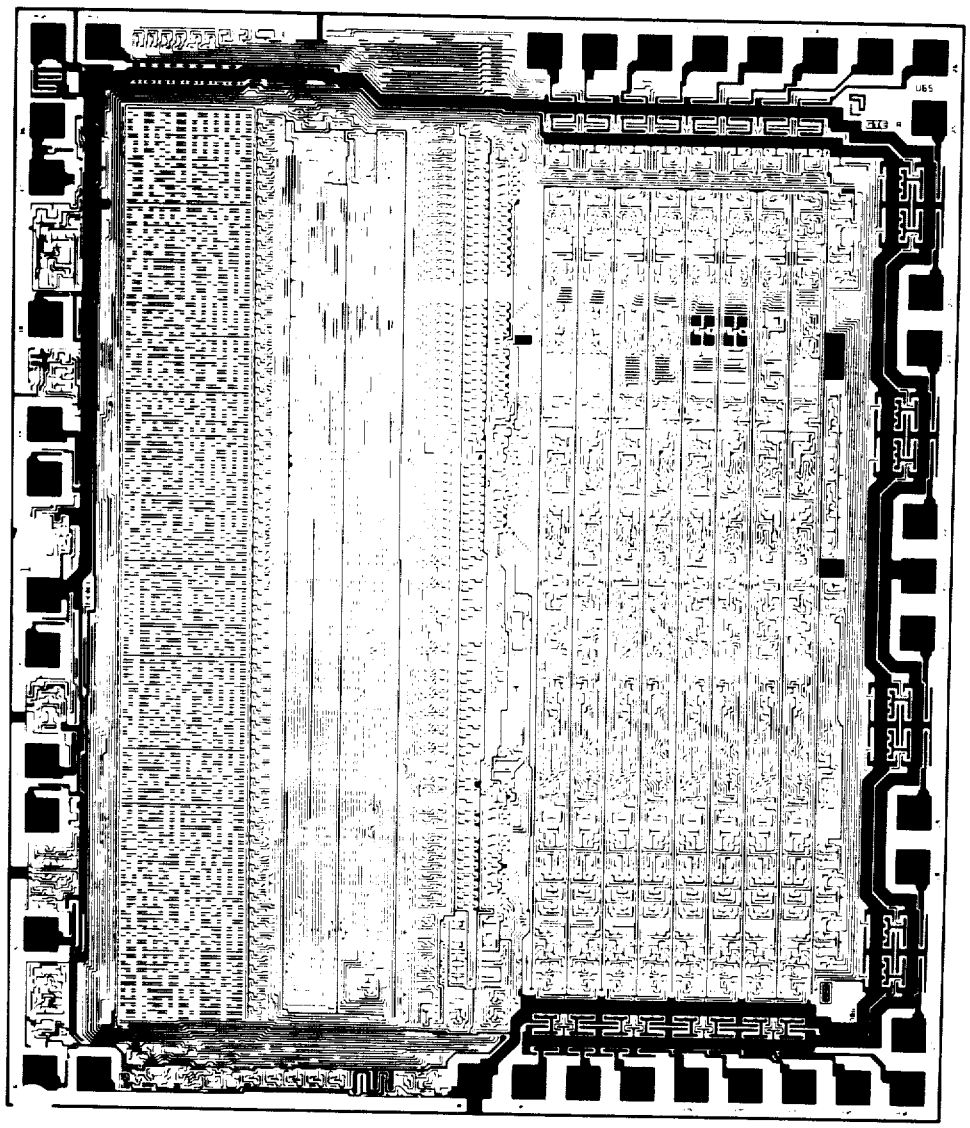
FIG. 10 is a scale image of the photo mask used in defining the metalization pattern of the chip.
Figure 11:
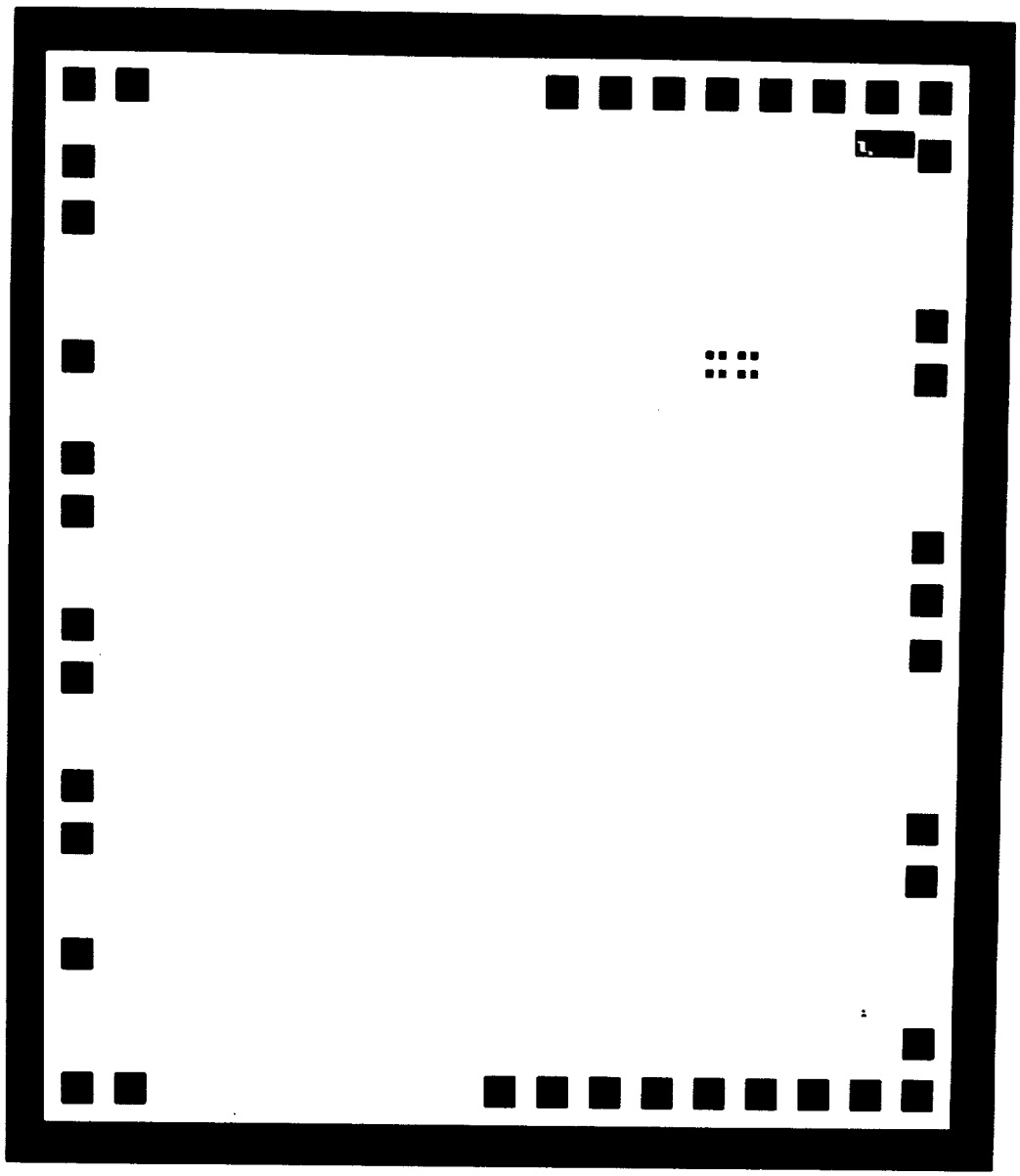
FIG. 11 is a scale image photomask used in defining the openings in the passivation layer to expose the bonding pads of the chip.

Next, it should be realized that a vertical polycrystaline silicon conductor such as those generally designated by reference number 160 in FIG. 3C and in FIG. 3 are electrically connected to the lower ends of respective ones of the "minterm" diffused conductors 162. The dots such as 171 represent the "preohmic" connections which accomplish this and are defined by the photo mask illustrated in FIG. 9. For convenience, it will be convenient to designate the ones of vertical polycrystaline silicon conductors 160 shown in FIG. 3C as 160-1, 160-2, 160-3- 160-4, 160-5 and 160-6.

Next, note that a horizontal metal conductor 172 with $V_{DD}$ volts (typically +5 volts) on its extends through the P channel "sum-of-minterm" read only memory region 116B. Between the various vertical polycrystaline silicon conductors 160, there are a plurality of vertical elongated P type diffused regions 173-1, 173-2, 173-3 and 173-4, each respectively connected by means of a preohmic contact, shown by a dot, to $V_{DD}$ conductor 172. Extending horizontally from the various vertical diffused conductors 173-1, 173-2, etc., there are a plurality of P-type horizontal diffused regions, such as those generally designated by reference numerals 174. These regions form the sources and drains of the P channel MOSFETs in "sum-of-minterm" decoding array or read only memory 116B. It can be seen that all of the P channel MOSFET source electrodes are connected to $V_{DD}$ volts, when it is recognized that all of the X's such as those designated by reference numeral 175 (where the vertical polycrystaline silicon conductors 160-1, 160-2, etc. cross the horizontal diffused regions such as 174) represent the gate electrodes of P channel MOSFETs.

Next, note that the metal conductors 157 shown in FIG. 3A are also designated by reference numeral 157 simply as straight lines in FIG. 3C. There are seventy-five of these horizontal metal conductors. It can be seen that each of the drain electrodes of each of the P channel MOSFETs is connected by means of a preohmic contact, represented in FIG. 3C by a dot such as 176, to a respective one of the seventy-five metal lines 157.

The signals produced on the horizontal metal conductors 157 are actually the logical OR functions of the various minterm signals produced by the N channel read only memory circuitry 116A, and therefore represent the sums of these minterms. These are the signals that are needed to load the clocked latches in register transfer section 131.

The fundamental layout or topography design problem is how to get these sum-of-minterm signals down into register transfer logic region 131 at the desired horizontal location above the register at which a corresponding data transfer must be effectuated in accordance with the instruction being decoded, without requiring an excessive amount of chip surface area. To understand this problem more thoroughly, it is again emphasized that the "sum-of-minterm" signals available on the various seventy-five metal conductors 157 are required underneath P channel region 116B, in register transfer logic section 131 as directly above the particular one of the registers 121A, 112, 113, 111, 110, 110A, etc. where that particular register transfer signal is needed, as is possible. Obviously, the seventy-five metal lines 157 cannot themselves be routed down to the register transfer section because none of the metal conductors can cross another one. So, in order to route the sum-of-minterm signals into register transfer logic section 131, it is necessary to provide either diffused or polycrystaline silicon conductors that are insulated from the metal conductors 157 so that they can cross over or under metal conductor 157 directly downward into register transfer logic circuitry 151 at the desired horizontal location. In order to facilitate explanation of several specific examples of this, the metal conductors 157 are respectively designated by reference numerals 157-1 through 157-12, respectively. Assume, for example, that it is desired to bring the sum-of-minterm signal on metal conductor 157-1 directly down into register transfer logic section 131 (FIG. 2) from a point between vertical polycrystaline silicon conductors 160-1 and 160-2. It should be readily apparent that this cannot be done with a metal conductor, because the metal conductor would result in a short circuit to all of the lower metal conductors 157-2 through 157-12. It should also be apparent that a P type diffused conductor cannot accomplish the desired routing either, because if the vertical polycrystaline silicon conductors 160-1, 160-2, etc., are spaced by the minimum allowable distance (as is essential since the objective is to minimize the amount of chip area), there is no possibility of avoiding a short circuit between diffused region 174-1 and the two lower diffused regions 174-2 and 174-3 and 174-4. It should also be readily apparent that the sum of minterm signal on metal conductor 157-1 cannot be brought directly down into register transfer logic section 131 by means of a polycrystaline silicon conductor, because polycrystaline conductors 160-1 and 160-2 are already closely spaced at the minimum allowable distance.

Thus, at least for the portion of read only memory sections 116A and 116B shown in FIG. 3C, it is simply not possible to route in an efficient manner the sum of minterm signal on metal conductor 157-1 down into register transfer logic section 131 between any of polycrystaline silicon conductors 160-1, 160-2, 160-3, 160-4, 160-5 or 160-6.

At this point, it should be noted that not all of the vertical polycrystaline minterm conductors 160 extend all the way downward through P channel array 116B in the vertical direction. For example, polycrystaline silicon conductor 160-3 terminates at metal conductor 157-7, and polycrystaline silicon conductors 160-5 and 160-6 both terminate at the level of horizontal metal conductor 157-4. Thus, the sum-of-minterm signals on horizontal metal conductors 157-5, 157-6, 157-7 and 157-8 can be brought directly downward into register transfer logic 131 (FIG. 2) by means of polycrystaline silicon conductors 165-2, 165-3, 165-4, and 165-1, respectively without causing any undesired short circuits, and without requiring any conductor "crossovers" between P channel array 116B and register transfer logic 131, if polycrystaline silicon conductors 160-3, 160-5, and 160-6 happen to be located at horizontal positions that are nearly directly above the portions of the register section at which the sum-of-minterm signals on metal conductors 157-8, 157-5, 157-6, and 157-7 are respectively needed.

At this point, it should be realized that although the relative horizontal location of the desired register transfer signals fed into register transfer logic section 131 is fixed, the relative horizontal position of the 252 vertical minterm conductors 160 can be varied to meet any desired requirements, as long as the end result is to get the vertical sum-of-minterm signal conductors out of the bottom of P channel array 116B at the needed horizontal location. Similarly, the seventy-five horizontal metal lines 156 can be interchanged in any desired order in order to achieve the same objective.

Consequently, although there are a very large number of possibilities for arranging the order of the 252 vertical polycrystaline silicon conductors 160 and the seventy-five horizontal metal conductors 157, it nevertheless is possible to arrange them in such a way that there are numerous opportunities to bring polycrystaline silicon conductors such as 165-1 through 165-4 directly down from P channel region 116B into register tranfer logic section 131 at the correct horizontal position. The trick then, is to arrange the order of both the vertical minterm diffusions 162 and the order of the seventy-five horizontal metal conductors 157 so that these "high" terminations of various ones of the polycrystaline silicon conductors 160 (such as 160-3, 160-5, and 160-6) occur at the correct horizontal position on the surface of the chip such that the horizontal metal conductors which conduct the the desired sum of minterm signals needed in register transfer logic 131 directly below such horizontal positions are located below those polycrystaline silicon minterm conductor terminations. Then polycrystalline silicon conductors such as 165-1, 165-2, and 165-3 can be used to conduct such sum-of-minterm signals to the point where they are needed in register transfer logic 131. Once this is accomplished for all or nearly all of the sum-of-minterm signals, the amount of chip area required for the N-channel read only memory section 116A and the P channel read only memory section 116B has been greatly minimized, and this P channel array 116B has been "mated" to the N channel array 116A to the extent that it is practical to use the P channel read only memory array 116B, instead of "random logic" decoding to accomplish the second or sum-of-minterm level of decoding of the instruction register.

I spent approximately a year thinking about and experimenting with this layout topography problem before I arrived at the foregoing conclusion; after three trial-and-error layouts, I was able to arrive at a "well mated" N channel minterm decoding read only memory 116A and a sum-of-minterm decoding P channel read only memory section 116B. Once this was achieved, it was the basis of a very successful CMOS chip topography design for my new implementation of a greatly improved CMOS microprocessor which is compatible with the prior art NMOS 605 microprocessor.

The seventy-five sum-of-minterm signals that are required to be input to the register transfer logic section 131 are listed in Table 1 below. Each minterm is listed with a symbol and a brief description that gates the function that the sum-of-minterm signal performs in order to effectuate execution of an instruction.

TABLE 1

| Sum-of-Minterm Number | Symbol | Description |
|---|---|---|
| 1. | S2: | Set state counter bit 2 |
| 2. | S1: | Set state counter bit 1 |
| 3. | R1: | Reset state counter bit 1 |
| 4. | S$\phi$: | Set state counter bit $\phi$ |
| 5. | R$\phi$: | Reset state counter bit $\phi$ |
| 6. | ML: | Memory hock pin control |
| 7. | VADL2: | Reset NMI and force address |
| 8. | Go to Z: | Force timing state $\phi$ |
| 9. | ZADL$\phi$: | Force $\phi$ to address bus $\phi$ |
| 10. | HDOLD: | Allows address latch to address pad |
| 11. | ADH/AB: | Internal address bus goes to address latch |
| 12. | ADL/AL: | Address low bus transfers to address latch |
| 13. | XSB: | X register transfers to internal S bus |
| 14. | SBX: | Internal S bus transfers to X register |
| 15. | YSB: | Y register transfers to internal S bus |
| 16. | SBY: | Internal S bus transfers to Y register |
| 17. | SSB: | Stack register transfers to S bus |
| 18. | SADL: | Stack register transfers to address low bus |
| 19. | SBS: | S bus transfers to stack register |
| 20. | ADLAX: | Address low bus transfers to ALU X input |
| 21. | DBAX: | Transfer internal data bus to ALU X input |
| 22. | DBAY: | Transfer internal data bus to ALU Y input |

TABLE 1-continued

| Sum-of-Minterm Number | Symbol | Description |
|---|---|---|
| 23. | ZAY: | Forces $\phi$ ALU Y input |
| 24. | SBAY: | S bus transfers to ALU Y input |
| 25. | T2029: | Forces additional cycle with carry operation |
| 26. | T3: | Forces additional cycle with carry operation |
| 27. | SR: | Allows shift operation from ALU |
| 28. | OR: | Allows OR operation from ALU |
| 29. | EOR: | Allows exclusive OR operation from ALU |
| 30. | SUM: | Allows the sum output from the ALU |
| 31. | ADADL: | Transfers ALU output to address low bus |
| 32. | ADSB: | Transfers ALU output to S bus |
| 33. | $\phi$AD7: | Forces $\phi$ to ALU shift register input |
| 34. | OFCIN: | Enables carry flag to ALU carry in |
| 35. | CYCIN: | Enables carry output to ALU carry in |
| 36. | 1CIN: | Forces a 1 to ALU carry in |
| 37. | DCE: | Causes hex to decimal conversion of ALU output |
| 38. | SDC: | Allows decimal subtraction |
| 39. | ADC: | Allows decimal addition |
| 40. | SBA: | Transfers S bus to accumulator |
| 41. | ADB: | Transfers accumulator to internal data bus |
| 42. | ASB: | Transfers accumulator to S bus |
| 43. | DBSB: | Transfers internal data bus to S bus |
| 44. | SBADH: | Transfers S bus to address high bus |
| 45. | ZADH$\phi$: | Forces $\phi$ to address high bus $\phi$ |
| 46. | ZADH: | Forces $\phi$ to address high bus 1 through 7 |
| 47. | ADC: | Controls adder inputs when only 1 operand |
| 48. | ADHPH: | Transfers address high bus to program counter high |
| 49. | PHDB: | Transfers program counter high to internal data bus |
| 50. | PHADH: | Transfers program counter high to address high bus |
| 51. | PLADL: | Transfers program counter low to address low bus |
| 52. | PLDB: | Transfers program counter low to internal data bus |
| 53. | PCIN: | Controls program counter carry in |
| 54. | ADLPL: | Transfer address low bus to program counter low |
| 55. | ZDB: | Forces $\phi$ on internal data bus |
| 56. | LV: | Loads the V flag from the ALU |
| 57. | TSTZ: | Modifies the Z flag from bit instructions |
| 58. | LOADC: | Transfers internal data bus to carry flag |
| 59. | LOADZ: | Modifies Z flag is all internal data buses are $\phi$ from op code |
| 60. | LSI: | Loads I flag |
| 61. | IR5: | Clears or sets flags depending on op code |
| 62. | LSD: | Loads decimal flag from op code |
| 63. | LZID: | Loads Z, I and D flags from internal data bus |
| 64. | LDNEG: | Transfers internal data bus 7 to negative detect latch |
| 65. | CLRV: | Clears V flag |
| 66. | LOADV: | Transfers internal data bus to V flag |
| 67. | LOADN: | Transfers internal data bus 7 to N flag |
| 68. | L5C: | Load C flag from op code |
| 69. | PDB: | Transfer flag register to internal data bus |
| 70. | DLADH: | Transfer data latch to address high bus |
| 71. | DLADL: | Transfer data latch to address low bus |
| 72. | DLDB: | Transfer data latch to internal data bus |
| 73. | WRITE: | Enables R/$\overline{\text{W}}$ pad and three state control of data bus pads |
| 74. | CYCF: | Transfer carry out to ALU to carry flag |

It should be noted that each of the seventy-five metal sum-of-minterm lines 157 is precharged to $V_{SS}$ or zero volts before sum-of-minterm decoding takes place. Those skilled in the art will recognize that the minterm decoding in N channel region 116A is essentially a logical ANDing type of decoding, while the sum-of-minterm decoding that occurs in region 116B is essentially a logic ORing type of decoding.

The charging devices for the sum-of-minterm conductors actually are implemented by means of N channel MOSFETs having their sources connected to $V_{SS}$ and their drains connected to respective ones of the polycrystaline silicon conductors such as 165-1 through 165-4 extending into the register transfer latches in section 131.

The primary advantage of moving the status register 117 down into the register section is that it reduces the capacitance of each of the data bus conductors of internal data bus 141 by approximately twenty percent over the capacitance they would otherwise have if the status register bits were distributed in the "random logic" portion of the chip underneath the instruction decode ROM, as in the old 6502 microprocessor, and reduces the chip are by allowing the above-described routing of sum-of-minterm signals to status register 117. This decrease in capacitance, of course, increases the operating speed of the microprocessor. The NMOS version of the 6502 presently available in the market is approximately 2 megahertz, whereas CMOS microprocessor 100 has an operating speed of approximately 4 megahertz. The power dissipation of the conventional N channel 6502 microprocessor is approximately 75 milliamps (times the 5 volt power supply, i.e., 375 milliwatts. CMOS microprocessor 100 draws approximately 1 milliamp, resulting in power dissipation of approximately 5 milliwatts, obviously providing a very significant speed advantage and power dissipation advantage over the conventional NMOS 6502 microprocessor. Placement of status register logic 117 between the high order address latch 120 and the precharge logic 140 was made for a particular reason. The polycrystaline silicon conductor lines that must be connected from the first through the eighth status register bits, the top status register bit being at the top of area 117 in FIG. 2, run down into the high order address buffer circuitry 120 in a staggered fashion, the top bit running all the way down, the second bit connection being the same width as and spaced from the first line, etc., i.e., from the top status register bit, there was one line going down to the area 120, from the second status register bit there are two lines going down to area 123, from the third status register bit there are three lines now going down into area 120, etc., all the way down to the eighth bit. These lines are spaced from each other and are in parallel, and together they occupy quite a lot of width at the lower end of area 117 in FIG. 2. This manner of connection of the lines that run from the high order address latch 120A down to area 120 is complementary to the fashion in which lines must be fed from portions of the chip above area 117 into area 117, i.e., from the register transfer logic circuitry 131.

The sequence of bonding pads around the periphery of microprocessor 100, starting in the upper left hand corner as shown in and proceeding counterclockwise, include the sync pad, the $V_{DD}$ pad, the A0-A15 address pads, the D7-D0 bonding pads, the R/W pad, the OSC (this is OUT) pad, the BE pad, the OSC (IN), the $\overline{SO}$ pad, the $\phi_2$ OUT pad, the RES pad, the $V_{SS}$ pad, the RDY pad, the $\phi_1$ OUT pad, the $\overline{IRQ}$ bonding pad, the $\overline{ML}$ pad, and the $\overline{NMI}$ bonding pad.

FIGS. 4 through 11 are scale images of the photo masks which are used during manufacture of microprocessor 100 using a well known state-of-the art silicon gate CMOS process known as the ISO-CMOS process.

Those skilled in the art will readily know the function of each of these masks in producing the various "layers" of the CMOS microprocessors or a silicon wafer, so explanation of these functions is omitted.

While the invention has been described with reference to a particular embodiment thereof, those skilled in the art will be able to make variations in the topography of certain portions of the described microprocessor chip without departing from the true spirit and scope of the invention.

For example, if the layout rules described above for minimum line widths and spacings and preohmic openings can be modified enough to make it possible to place inverters at the lower ends of each of the vertical N-typed diffused regions 160-1, 160-2, etc. of FIG. 3C, then the sum of minterm decoding region 116 can be implemented by means of a faster N-channel read only memory array instead of the P channel as disclosed herein.

I claim:

1. An integrated circuit chip including a microprocessor having a surface, said microprocessor comprising in combination:
   (a) data bus means on said surface for transferring digital data;
   (b) address bus means on said surface for transferring digital address information;
   (c) register circuit means on said surface coupled to said data bus means and said address bus means for storing digital information received from said data bus means and said address bus means and transferring digital information to and from said data bus means and said address bus means in accordance with execution of program instructions by said microprocessor;
   (d) address output buffer circuit means on said surface coupled to said address bus means for temporarily storing digital address information from said microprocessor;
   (e) instruction decoding circuit means located above said register circuit means for decoding instructions to be executed by said microprocessor, said instruction decoding circuit means including
      i. first read-only memory circuit means including a plurality of FETs arranged in an array for producing a plurality of minterm signals in response to instruction information in an instruction register on said surface,
      ii. second read-only memory circuit means including a plurality of FETs arranged in an array for producing a plurality of sum-of-minterm signals in response to said minterm signals, and
      iii. register transfer circuit means responsive to said sum-of-minterm signals for effectuating electrical coupling between registers in said register circuit means, said data bus means and said address bus means in accordance with the instruction being executed, in order to effect predetermined data transfers therebetween, said register transfer circuit means being disposed above said register circuit means, and second read-only memory circuit means being disposed above said register transfer circuit means, and said first read-only memory circuit means being disposed and above said second read-only memory circuit means, said data bus means and said address bus means extending horizontally through said register circuit means;

said FETs in said first read-only memory circuit means being arranged as vertical groups of series-coupled FETs, said minterm signals being coupled at the bottom of said first read-only memory circuit means to a plurality of conductors, respectively, which are connected to gate electrodes of various ones of said FETs in said second read-only memory circuit means, said FETs in said second read-only memory circuit means being arranged as horizontal groups of parallel-coupled FETs on the drain electrodes of which said sum-of-minterm signals are produced;

(f) a first group of horizontal conductors connected, respectively, to various drains of said FETs of said second read-only memory circuit means, for each conducting a respective one of said sum-of-minterm signals; and (g) a second group of horizontal conductors conducting said instruction information from said instruction register to various ones of said FETs of said first read-only memory circuit means.

2. The integrated circuit chip of claim 1 wherein said vertical group of FETs and said horizontal groups of FETs are positioned to allow each of a substantial majority of said minterm conducting conductors to terminate, without extending lower into said second read-only memory circuit means, on a gate electrode of one of said FETs of said second read-only memory circuit means, a drain electrode of which is connected to a one of said horizontal conductors of said first group that is located above a lower one of said horizontal conductors of said first group conducting one of said sum-of-minterm signals, a plurality of conductors, on a layer insulated from the layer of said first group of horizontal conductors, each of the plurality of conductors being connected, respectively, to one of said lower horizontal conductors and conducting one of said sum-of-minterm signals to a respective portion of said data transfer circuit means located substantially directly beneath that minterm conducting conductor.

* * * * *